US011026417B2

(12) United States Patent
Power, II et al.

(10) Patent No.: US 11,026,417 B2
(45) Date of Patent: Jun. 8, 2021

(54) TREE MOUNTABLE GEAR HOLDING ASSEMBLY

(71) Applicant: Tethrd LLC, Jordan, MN (US)

(72) Inventors: Walter Ernest Power, II, Jordan, MN (US); Gregory Alan Godfrey, Richmond Hill, GA (US); Carl Eugene Kossuth, III, Jordan, MN (US)

(*) Notice: Subject to any disclaimer, the term of this patent is extended or adjusted under 35 U.S.C. 154(b) by 0 days.

(21) Appl. No.: 16/573,569

(22) Filed: Sep. 17, 2019

(65) Prior Publication Data

US 2021/0076666 A1 Mar. 18, 2021

(51) Int. Cl.
*A01M 31/02* (2006.01)
*F16B 2/08* (2006.01)
*F16M 13/02* (2006.01)

(52) U.S. Cl.
CPC .............. *A01M 31/02* (2013.01); *F16B 2/08* (2013.01); *F16M 13/022* (2013.01)

(58) Field of Classification Search
CPC . A45F 2005/006; A01M 31/02; F16M 13/022
See application file for complete search history.

(56) References Cited

U.S. PATENT DOCUMENTS

| | | | | |
|---|---|---|---|---|
| 2,577,713 A * | 12/1951 | Nogle | ................... | A47B 81/005 211/64 |
| 4,654,991 A * | 4/1987 | Jones | ..................... | A63H 33/40 211/118 |
| 4,995,537 A * | 2/1991 | Thedieck | ................. | B60R 7/14 211/64 |
| 5,027,960 A * | 7/1991 | Rainville | ............... | A47G 29/00 211/118 |
| 5,143,266 A | 9/1992 | Heckerman | | |
| 5,308,101 A * | 5/1994 | Monty | .................. | B60D 1/182 267/74 |
| 5,544,797 A * | 8/1996 | Silva | ...................... | B60R 7/005 224/311 |
| 5,688,011 A * | 11/1997 | Gulley | .................... | B66C 1/105 294/74 |
| 5,738,080 A | 4/1998 | Brocco, Jr. | | |
| 5,842,584 A * | 12/1998 | Baird | ...................... | B25F 5/029 211/69.1 |
| 6,000,591 A * | 12/1999 | Alexander | ................ | A45F 3/14 211/113 |
| 6,158,593 A * | 12/2000 | Olsen | ..................... | A63B 47/00 211/14 |
| D454,235 S * | 3/2002 | Kaplan | ........................ | D30/153 |
| 6,357,551 B1 * | 3/2002 | Bogardus, III | ........... | E06C 1/56 182/190 |

(Continued)

*Primary Examiner* — Stanton L Krycinski

(57) ABSTRACT

A tree mountable gear holding assembly includes a strap that is elongated and has a first end, a second end, a first side and a second side. A plurality of article loops is positioned on the first side and each is engageable with articles to be suspended on the strap. The article loops form a continuous line of loops covering at least 75% of the first side. A slide buckle is mounted on the strap adjacent to the second end. A hook is attached to the slide buckle. The hook is removably extendable through one of the article loops to form closed loop with the elongated strap. The slide buckle is movable toward the terminal loop on the strap to shorten a circumference of the closed loop. A free section of strap is defined from the first end to the article loop engaged with the hook.

16 Claims, 4 Drawing Sheets

(56) References Cited

U.S. PATENT DOCUMENTS

| | | | |
|---|---|---|---|
| 6,405,909 B1 * | 6/2002 | Burnett | B60R 7/043 |
| | | | 211/64 |
| 6,606,768 B2 | 8/2003 | Henry | |
| 6,910,578 B2 * | 6/2005 | Stern | B25H 3/003 |
| | | | 206/379 |
| 6,981,571 B2 * | 1/2006 | Diggle | A63B 27/00 |
| | | | 182/133 |
| 7,207,118 B2 * | 4/2007 | Watters | A45C 13/30 |
| | | | 33/290 |
| D573,381 S | 7/2008 | Pinholster, Jr. | |
| 7,585,197 B1 * | 9/2009 | Merten | B63B 27/146 |
| | | | 182/136 |
| D666,896 S | 4/2012 | Pinholster, Jr. | |
| D661,175 S * | 6/2012 | Dahl | D8/349 |
| 8,443,471 B2 * | 5/2013 | McCurdy | D07B 1/02 |
| | | | 5/120 |
| 8,505,683 B1 * | 8/2013 | Dirrig | A63B 27/00 |
| | | | 182/9 |
| 8,590,116 B2 * | 11/2013 | Dahl | D07B 1/18 |
| | | | 24/300 |
| D712,555 S | 9/2014 | Berg | |
| 8,944,976 B2 * | 2/2015 | Crowell | A63B 21/0442 |
| | | | 482/121 |
| 9,003,579 B1 * | 4/2015 | Pinholster, Jr. | A45F 3/22 |
| | | | 5/120 |
| D760,503 S | 7/2016 | Arguelles | |
| 9,528,655 B1 * | 12/2016 | Miles | F16M 13/022 |
| 9,763,530 B2 * | 9/2017 | Caccavo | A47H 19/00 |
| 9,907,389 B2 | 3/2018 | Conlin | |
| 10,292,485 B2 * | 5/2019 | Conlin | D03D 11/02 |
| 2007/0102380 A1 * | 5/2007 | Shaw | A47B 81/005 |
| | | | 211/70.5 |
| 2010/0108626 A1 * | 5/2010 | Sorensen | B60R 7/08 |
| | | | 211/70.8 |
| 2011/0146558 A1 * | 6/2011 | Korell | B63B 21/00 |
| | | | 114/230.26 |

* cited by examiner

TREE MOUNTABLE GEAR HOLDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to gear holding devices and more particularly pertains to a new gear holding device for holding items, particularly those articles used by a hunter during a hunt, on a tree or other vertical support so that the gear is easily accessible by a hunter positioned in or adjacent to the tree.

(2) Description of Related Art Including Information Disclosed Under 37 CFR 1.97 and 1.98

The prior art relates to gear holding devices in general but which do not allow for easy mounting to trees or include means for holding many articles simultaneously.

BRIEF SUMMARY OF THE INVENTION

An embodiment of the disclosure meets the needs presented above by generally comprising a strap that is elongated and has a first end, a second end, a first side, a second side, an upper edge and a lower edge wherein the first and second ends define free ends. A plurality of article loops is positioned on the first side and each is configured to engage articles to be suspended on the strap. The article loops form a continuous line of loops covering at least 75% of the first side. The article loop closest to the second end defines a terminal loop. A connector is attached to the strap adjacent to the second end. The connector is removably couplable to the strap at a point between the terminal loop and the first end to form closed loop with the elongated strap. The closed loop is configured to be extended around and frictionally engage a tree. A free section of strap is defined from the first end to the connector.

In another embodiment of the disclosure meets the needs presented above by generally comprising a strap that is elongated and has a first end, a second end, a first side, a second side, an upper edge and a lower edge. The first and second ends define free ends. A plurality of article loops is positioned on the first side and each article loop is configured to releasably engage articles to be suspended on the strap. The article loops form a continuous line of loops covering at least 75% of the first side. A slide buckle is mounted on the strap adjacent to the second end. A hook is attached to the slide buckle. The hook is removably extendable through one of the article loops to form closed loop with the elongated strap. The slide buckle is movable toward the terminal loop on the strap to shorten a circumference of the closed loop. A free section of strap is defined from the first end to the particular article loop engaged with the hook.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
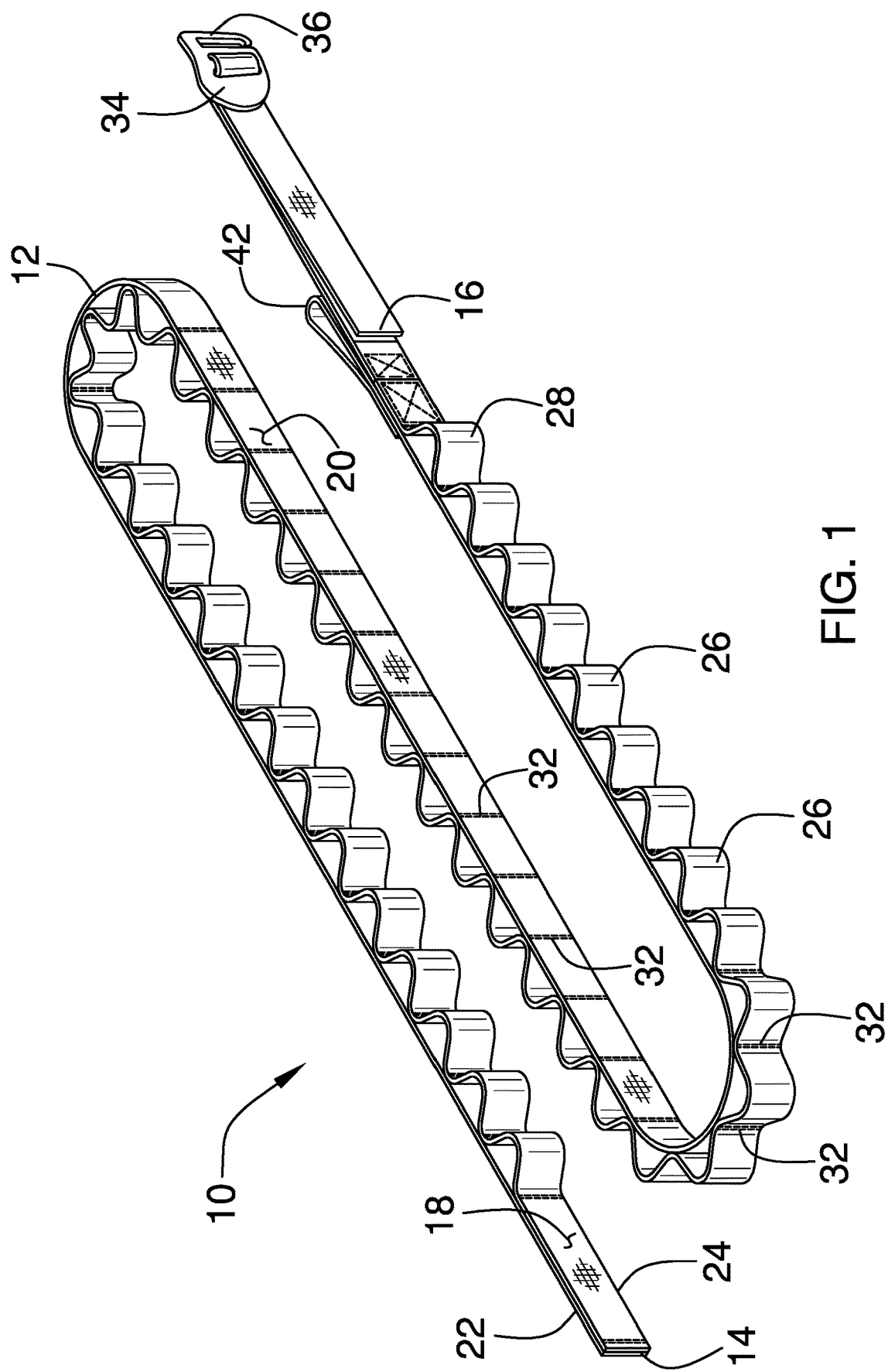
FIG. 1 is a top isometric view of a tree mountable gear holding assembly according to an embodiment of the disclosure.
Figure 2:
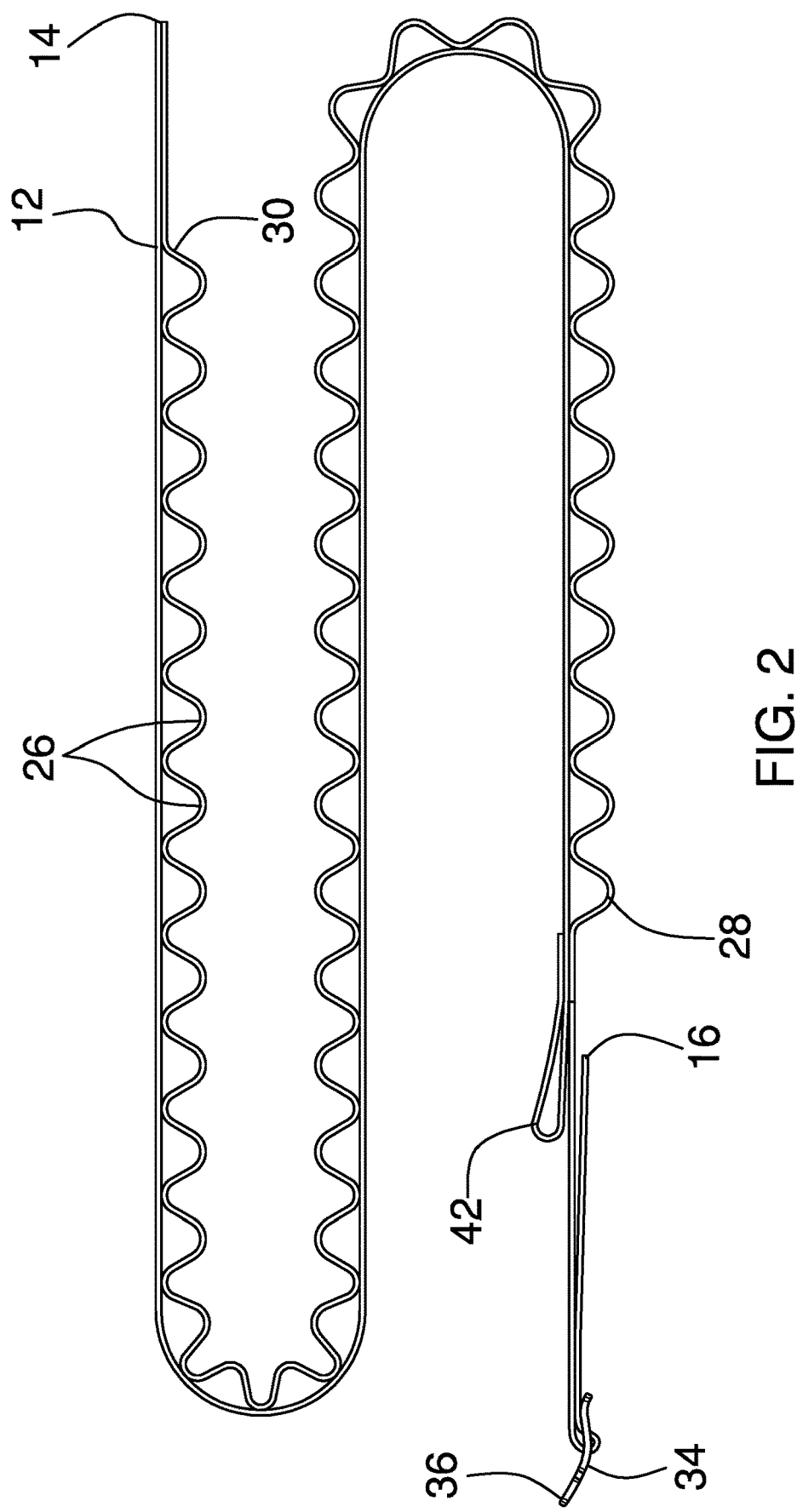
FIG. 2 is a bottom view of an embodiment of the disclosure.
Figure 3:
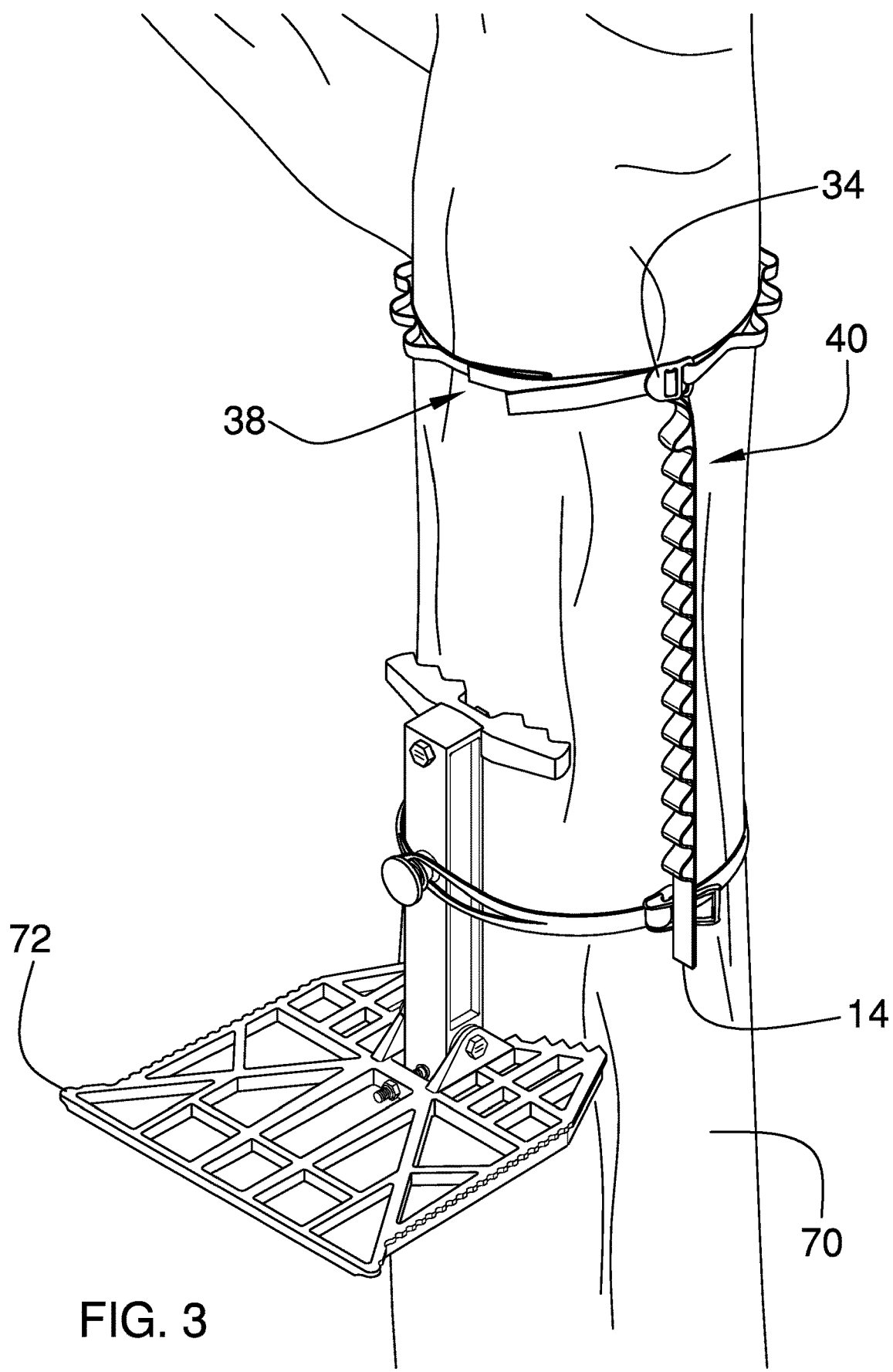
FIG. 3 is a front isometric view of an embodiment of the disclosure.

With reference now to the drawings, and in particular to FIGS. 1 through 4 thereof, a new gear holding device embodying the principles and concepts of an embodiment of the disclosure and generally designated by the reference numeral 10 will be described.

As best illustrated in FIGS. 1 through 4, the tree mountable gear holding assembly 10 generally comprises a strap 12 that is elongated and flexible. The strap 12 may be comprised of any conventional strapping or webbing material. The strap 12 has a first end 14, a second end 16, a first side 18, a second side 20, an upper edge 22 and a lower edge 24. While the first 18 and second 20 sides may be planer, the strap 12 may have an oval or tubular shape wherein the first 18 and second 20 sides are generally defined as being positioned on opposite sides of the strap 12 relative to each other. The first 14 and second 16 ends define free ends of the strap 12. While the strap 12 may have length equal to at least 4.0 feet, a distance from the first end 14 to the second end 16 will typically be between 4.0 feet and 8.0 feet. A distance from the upper edge 22 to the lower edge 24 is less than 2.0 inches.

A plurality of article loops 26 is positioned on the first side 18 and is configured to engage articles to be suspended on the strap 12. The article loops 26 are spaced from the second end 16 a distance equal to at least 3.0 inches and usually less than 18.0 inches. An article loop 26 nearest the second end 16 defines a terminal loop 28. The strap 12 is generally covered with the article loops 26 wherein the article loops 26 will most characteristically form a continuous line of loops covering at least 75% of the first side 18. The term "continuous" means that each article loop 26 is positioned within 1.0 inches of an adjacent one of the article loops 26. Each of the article loops 26 extends away from the first side 18 a distance of less than 3.0 inches. As can be readily understood from the Figures, in one embodiment the article loops 26 may be formed by sewing a secondary strap 30 to the strap 12 wherein threading 32 extends through the strap 12 and secondary strap 30 along lines extending from the upper edge 22 to the lower edge 24. The secondary strap 30 is bunched up between lines of threading 32 to form the article loops 26. A distance between the lines of threading is normally 2.5 inches or less. Each article loop 26 has an open top side corresponding to the upper edge 22 and an open bottom side corresponding to the lower edge 24.

A connector 33 is mounted on the strap and is positioned adjacent to the second end 16 of the strap 12 and more particularly will typically be positioned between the second end 16 and the terminal loop 28. However, in some instances the connector may comprise the second end 16 as indicated below. The connector 33 releasably engages the strap 12 at a point between the connector 33 and the first end 14. This allows the strap 12 to be formed into a closed loop 38 extendable around and frictionally engageable with a tree 70. A portion of the strap between the connector 33 and the first end 14, when the connector 33 is attached to the strap 12, defines a free section 40 of the strap 12.

The connector 33 may include a receiving loop 42 that is attached to the second side 20 of the strap 12. The receiving loop 42 is positioned between the terminal loop 28 and the second end 16, though the receiving loop 42 may also include the second end 16. The receiving loop 42 receives the first end 14 and the free section 40 of the strap 12. The receiving loop stabilizes the positioning of the free section relative to the closed loop.

The connector 33 may further include, or may comprise without the receiving loop, a slide buckle 34 that is mounted on the strap 12 and is positioned between the terminal loop 28 and the second end 16. The slide buckle 34 is movable between the second end 16 and the terminal loop 28 to alter a distance between the slide buckle 34 and the first end 14. The slide buckle 34 may comprise what is commonly known as a tri-glide type buckle wherein the second end 16 is extended through the slide buckle 34 and looped back through the slide buckle 34 to create friction where the strap 12 overlaps itself on the slide buckle 34. Consequently the slide buckle 34 can be selectively retained on the strap 12 where desired.

Figure 4:
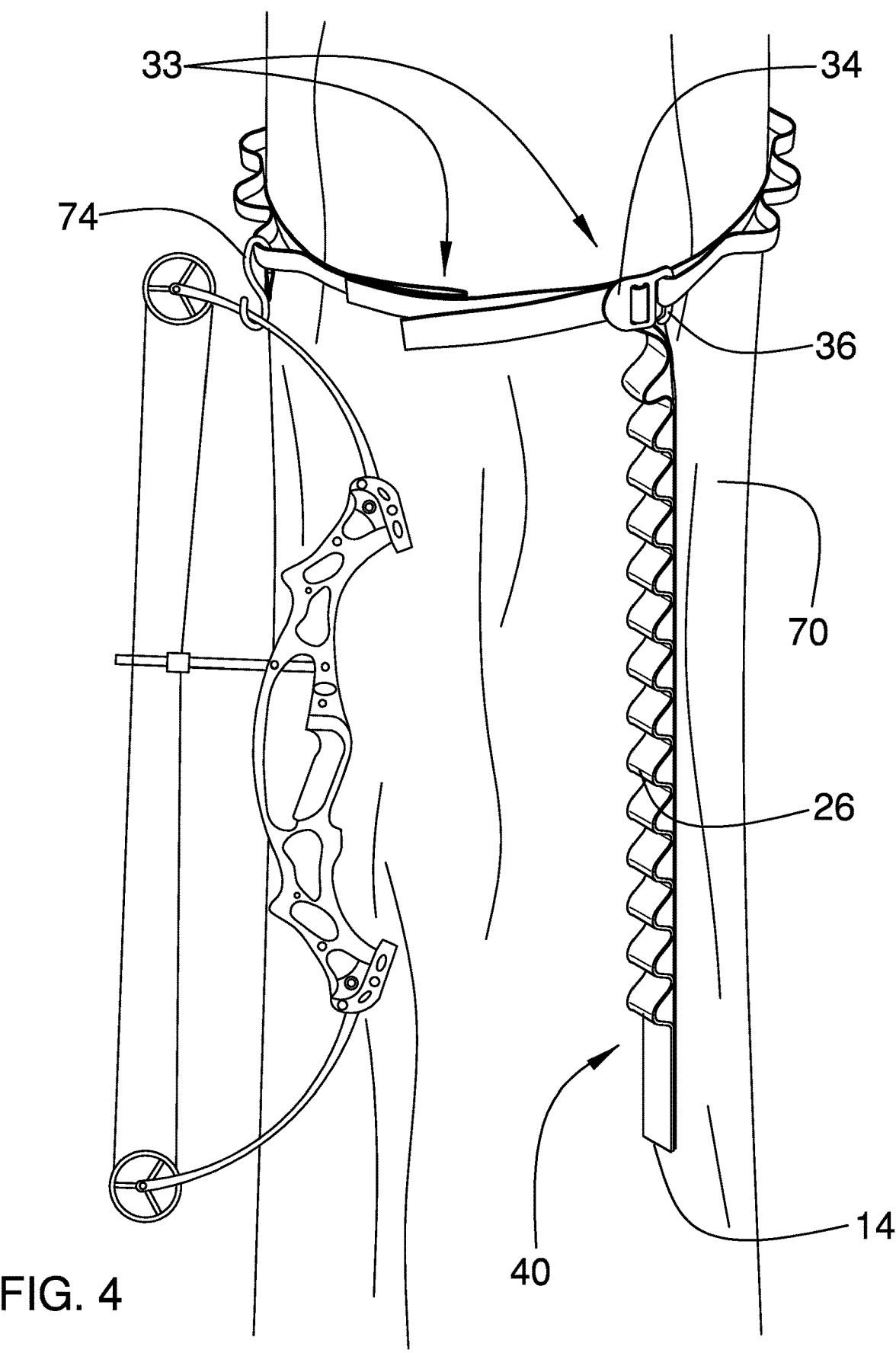
FIG. 4 is a front isometric view of an embodiment of the disclosure.

A hook 36 is attached to the slide buckle 34 and extends away from the strap 12, or more particularly from the first end 14 when the strap 12 is elongated in a straight line. The hook 36 is removably extendable through one of the article loops 26 to form the closed loop 38 with the elongated strap 12. As can be seen in FIG. 4, this allows the strap 12 to be extended around and secured to a tree 70. The slide buckle 34 is movable toward the terminal loop 28 on the strap 12 to shorten a circumference of the closed loop 38. Because there are a number of article loops 26 on the strap 12, a user first picks an article loop 26 which approximates a circumference of the tree 70. Once the hook is engaged with the selected article loop 26, the second end 16 of the strap 12 is pulled to move the slide buckle 34 toward the first end 14 and tighten the strap 12 on the tree 70. The free section 40 of strap 12 is then defined from the first end 14 to the article loop 26 engaged with the hook 36, wherein the free section 40 hangs freely from the closed loop 38.

In use, the strap 12 is placed around the tree 70 as stated above and shown in the Figures. The user utilizes the connector 33 to create the closed loop 38 around the tree 70 wherein the strap 12 will frictionally engage the tree 70. The user has the option of extending the first end 14 through the receiving loop 42 and may cinch the closed loop 38 such that the strap 12 frictionally engages the tree 70. If a heavy object, such as a backpack, is then hung from the free section 40, the weight of the heavy object will usually keep the closed loop 38 in a selected location on the tree 70. However, the user may also, or instead, use the hook 36 to engage one of the article loops 26 and then tighten the closed loop 38 with the buckle 34. With all options, the assembly 10 will then be to hold hunting gear. Specifically, the assembly is very useful when used in combination with a tree stand platform 72 to hold hunting gear in a location that is easily accessible to a hunter positioned on the platform 72. Hooks 74 or other couplers, such as MOLLE connectors (modular lightweight load-carrying equipment), may be positioned on the article loops 26 to assist in holding those items which do not have hook or hook like elements. It should be understood that the article loops 26 on both of the closed loop 38 and free section 40 may be used to secure items to the tree 70

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A hunting gear holding assembly configured to be placed around a tree to support articles on the tree, said assembly comprising:
    a strap being elongated and having a first end, a second end, a first side, a second side, an upper edge and a lower edge, said first and second ends defining free ends;

a plurality of article loops being positioned on said first side and being configured to engage articles to be suspended on said strap, said article loops forming a continuous line of loops covering at least 75% of said first side, one of said article loops closest to said second end defining a terminal loop, each article loop being statically coupled to said strap wherein each article loop has a fixed size and position along said strap; and a connector being attached to said strap adjacent to said second end, said connector being removably couplable to said strap at a point between said terminal loop and said first end by attachment of said connector to a selectable one of said article loops to form a closed loop with said elongated strap, the closed loop being configured to be extended around and frictionally engage a tree, a free section of strap being defined from said first end to said connector, said connector being a slide buckle being mounted on said strap adjacent to said second end.

2. The hunting gear holding assembly according to claim 1, wherein a distance from said first end to said second end is between 4.0 feet and 8.0 feet.

3. The hunting gear holding assembly according to claim 1, wherein said article loops being spaced from said second end a distance equal to at least 6.0 inches.

4. The hunting gear holding assembly according to claim 1, wherein each of said loops extends away from said first side a distance of less than 3.0 inches.

5. The hunting gear holding assembly according to claim 1, wherein said connector includes a receiving loop being attached to said second side of said strap, said receiving loop being positioned between said terminal loop and said second end, said receiving loop receiving said first end and said free section of said strap.

6. The hunting gear holding assembly according to claim 5, wherein said connector further includes a hook being attached to said slide buckle, said hook being removably extendable through one of said article loops, said slide buckle being movable toward said terminal loop on said strap to shorten a circumference of said closed loop.

7. The hunting gear holding assembly according to claim 1, wherein said connector includes a hook being attached to said slide buckle, said hook being removably extendable through one of said article loops, said slide buckle being movable toward said terminal loop on said strap to shorten a circumference of said closed loop.

8. The hunting gear holding assembly according to claim 5, wherein a distance from said first end to said second end is between 4.0 feet and 8.0 feet.

9. The hunting gear holding assembly according to claim 6, wherein a distance from said first end to said second end is between 4.0 feet and 8.0 feet.

10. A hunting gear holding assembly configured to be placed around a tree to support articles on the tree, said assembly comprising:

a strap being elongated and having a first end, a second end, a first side, a second side, an upper edge and a lower edge, said first and second ends defining free ends;

a plurality of article loops being positioned on said first side and being configured to engage articles to be suspended on said strap, said article loops forming a continuous line of loops covering at least 75% of said first side;

a slide buckle being mounted on said strap adjacent to said second end; and a hook being attached to said slide buckle, said hook being removably extendable through one of said article loops to form a closed loop with said elongated strap, said slide buckle being movable toward said terminal loop on said strap to shorten a circumference of said closed loop, a free section of strap being defined from said first end to said article loop engaged with said hook.

11. The hunting gear holding assembly according to claim 10, wherein a distance from said first end to said second end is between 4.0 feet and 8.0 feet.

12. The hunting gear holding assembly according to claim 10, wherein said article loops being spaced from said second end a distance equal to at least 6.0 inches, an article loop nearest said second end defining a terminal loop, said slide buckle being positioned between said second end and said terminal loop.

13. The hunting gear holding assembly according to claim 10, wherein each of said loops extends away from said first side a distance of less than 3.0 inches.

14. The hunting gear holding assembly according to claim 10, further including:

a free section of strap being defined from said first end to said article loop engaged with said hook; and a receiving loop being attached to said second side of said strap, said receiving loop being positioned between said terminal loop and said second end, said receiving loop receiving said first end and said free section of said strap.

15. The hunting gear holding assembly according to claim 11, further including:

a free section of strap being defined from said first end to said article loop engaged with said hook; and a receiving loop being attached to said second side of said strap, said receiving loop being positioned between said terminal loop and said second end, said receiving loop receiving said first end and said free section of said strap.

16. The hunting gear holding assembly according to claim 12, further including:

a free section of strap being defined from said first end to said article loop engaged with said hook; and a receiving loop being attached to said second side of said strap, said receiving loop being positioned between said terminal loop and said second end, said receiving loop receiving said first end and said free section of said strap.

* * * * *